United States Patent Office 3,215,620
Patented Nov. 2, 1965

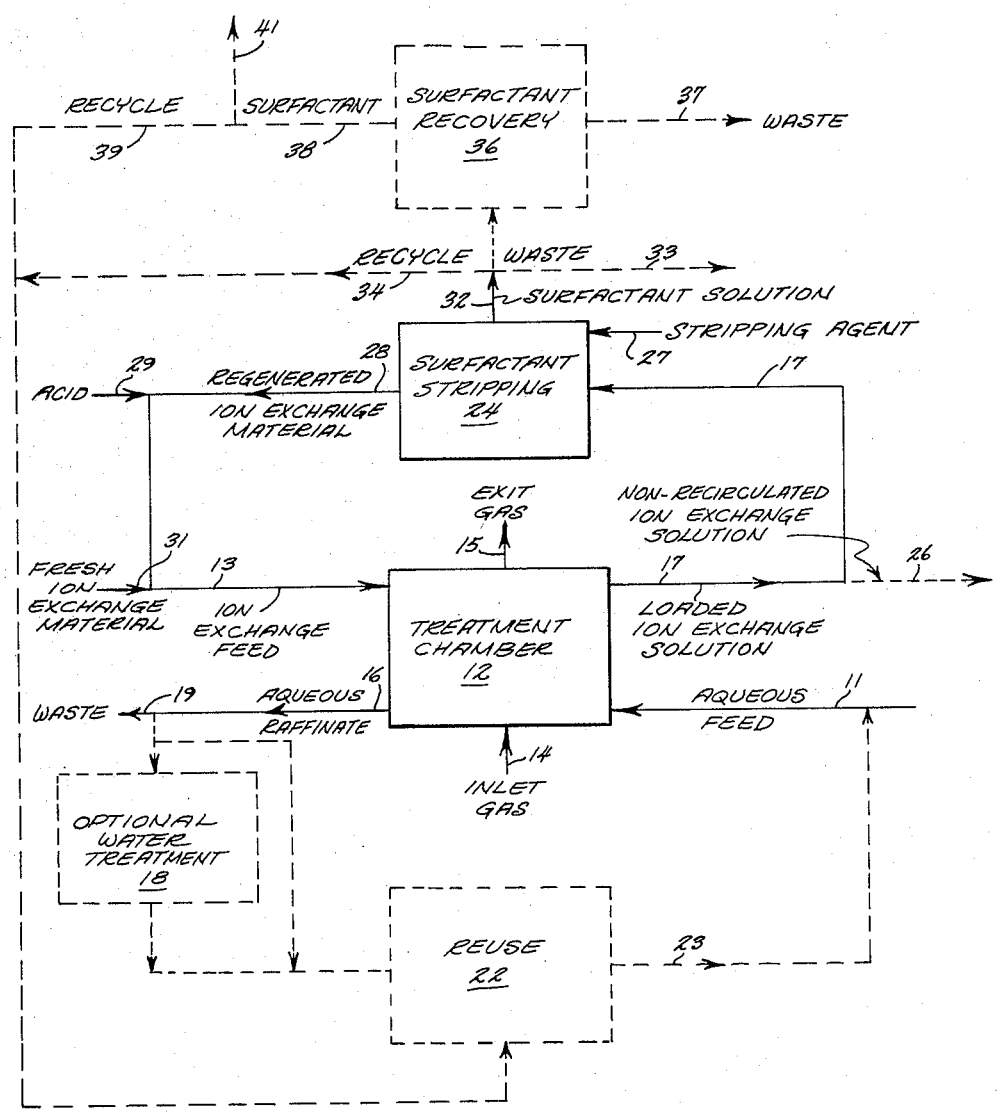

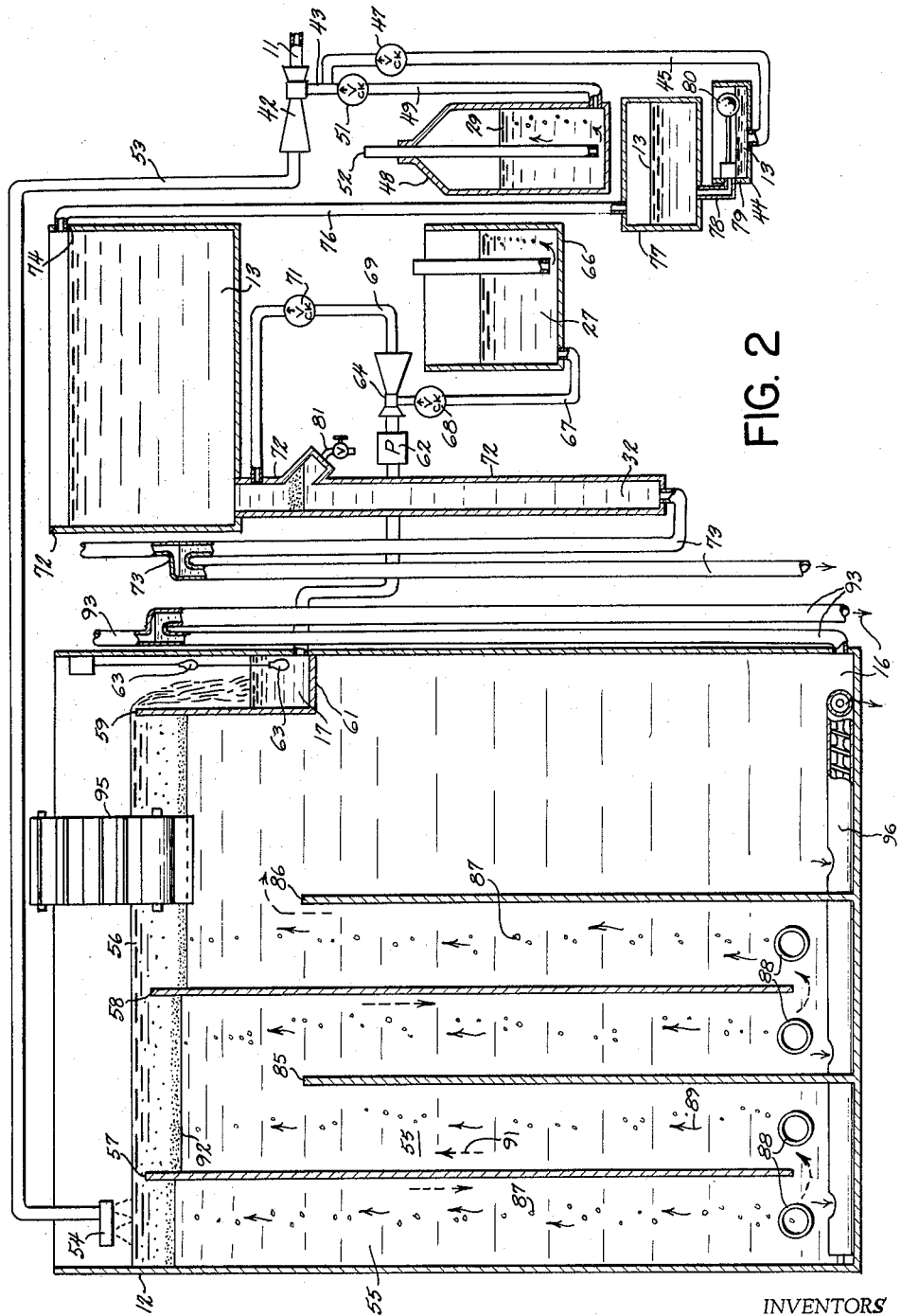

3,215,620
ION EXCHANGE OF ANIONIC SURFACTANTS
Herbert N. Dunning, St. Paul, and Maurice M. Kreevoy and James M. White, Minneapolis, Minn., assignors to General Mills, Inc., a corporation of Delaware
Filed June 8, 1962, Ser. No. 201,149
11 Claims. (Cl. 210—21)

This application is a continuation-in-part of United States patent application Serial No. 105,807, filed April 26, 1961 and now abandoned.

This invention relates to a separative process and more particularly to a method for removing anionic surfactants from aqueous solutions.

Separative processes are widely used in chemical and related industries. A few typical separative processes include distillation, decantation, sedimentation, filtration, evaporation, ion exchange, foam fractionation, absorption, adsorption, dialysis, crystallization, emulsion fractionation, and the like. Each of these processes has certain advantages and disadvantages which makes it particularly applicable to solving a certain separation problem. One of the more difficult separation problems is the removal of a surface active compound from an aqueous solution. There are two related problems involved. One problem is the removal and recovery of the surface active agent, and the other problem is the purification of the aqueous medium. Typically, very small amounts of surface active materials have profound effects on the properties of an aqueous system. If one is mainly concerned with purifying aqueous media, the surface active agent must be reduced to a very low concentration to eliminate the effect of the surface active material. Where the problem involves recovery of the surface active material, the reduction of the concentration to an extremely low level is not so acute, except where the surface active material is highly valuable.

The removal of surface active materials is of particular interest in the treatment of sewage and industrial wastes. The separation of surfactants from the sewage has recently become more acute with the wide-spread use of anionic detergents, particularly of the alkyl aryl sulfonate type. Unlike the previously used soaps, these detergents are not readily consumed by bacteria and other organisms. Accordingly, when sewage containing an alkyl aryl sulfonate is discharged into a river or lake or disposed of underground, the alkyl aryl sulfonate becomes a more or less permanent addition to the body of water. In rivers, the amount of detergent builds as the river flows past communities discharging detergent containing sewage. In many parts of this country, lakes and ground water are already contaminated with detergents. In most sections of the country, this problem is presently not acute. However, the levels of detergent in these bodies of water will continue to grow, and in the future, will present a hazard not only to drinking water for human consumption, but also to fish and other life dwelling in our lakes and rivers. Further, it may render the water unuseable in many present commercial operations. At the present time in some localities of the country the level of detergent in the available water supply is sufficiently high to affect adversely the foaming properties of beer made therefrom. In anticipation of the continuing build up of detergents, some breweries are considering processes for removing detergent from their water supply. This is just one example, of many industries whose products or processes require water of high purity.

The problem of detergent contamination has been avoided in some of the countries of the world by prohibiting the use of detergents. This is unfortunate, since detergents are highly effective cleansing agents. It would be highly advantageous to the peoples of such countries if there were available to them a process which would cheaply remove detergents from sewage and industrial wastes so that detergents could be used in cleansing processes.

In the United States, launderettes have become quite popular. If the detergents were removed from the sewage of laundries and laundromats, the amount of contamination of water supplies would be considerably reduced. In addition to this immediate problem, is the treatment of the entire sewage and industrial wastes of factories and communities.

There has been very little success in adopting the known separative processes to the removal of detergents and other surfactants from sewage and industrial wastes. This is primarily because of the large volumes of material to be handled and the low concentration of detergents. In order for any method to be practical, there must be a very low cost per unit of material treated. The difficulties in adapting presently available processes to sewage treatment are illustrated by considering a process such as solvent extraction. This process has been mentioned in the prior art as a method of purifying sewage by removal of greases and other organic-soluble materials. In a solvent extraction process large amounts of solvents are generally required. In many cases these solvents present hazards of fire and explosion. Low volatility solvents often do not provide the necessary extraction efficiency. There are also the problems of the contamination of the treated material with the extracting solvent and the expense involved in the attrition of the solvent. Perhaps the greatest difficulty with solvent extraction is the cost of separating the solvent and the extracted materials. Generally, distillation or some other expensive process is required.

A method which has been recently suggested for the treatment of waste water is the foam fractionation method. Using this technique, liquids containing surface active compounds are foamed by passing a gas through the liquid. The foam is then recovered and condensed. It is found that the concentration of the surface active agents is higher in the condensate than in the residual liquid or the original feed solution. The difficulty with the foam fractionation process is that considerable equipment is required to handle and condense the large amounts of foam which are produced. In addition, the treatment generally requires several treating stages in order to remove a substantial portion of the surface active material. While this method is particularly suited to quite dilute solutions, when the solution becomes so dilute that it does not foam readily, additional removal of surface active agents becomes difficult and expensive. Even under the best conditions the removed surfactant is diluted by large amounts of water.

Froth flotation has also been employed to remove suspended particles from aqueous solutions. Froth flotation has sometimes been confused with foam fractionation, but the two are very different in principle. In froth flotation, the particles are treated to make them hydrophobic and then are removed from the water by being attached to rising bubbles of air.

Emulsion fractionation has also been considered for sewage treatment, although the process is notoriously expensive. This technique involves mixing an aqueous phase and an immiscible organic phase to form an emulsion. When the emulsion is partially broken, the concentration of surface active materials in the emulsion phase is greater than in either the aqueous or the organic liquid phase. By separating the emulsion phase and breaking the emulsion, a concentration of the interfacially active compounds will be found.

From this discussion, it should be apparent that it would be highly desirable to provide a process for the separation of surface active materials from sewage and other aqueous mixtures. The above-described and other deficiencies of the prior art are overcome by the process of the present invention.

It is an object of this invention to provide an improved system of removing detergents from aqueous systems. It is another object of this invention to provide a highly efficient separative process for surface active materials. It is a further object of this invention to provide a novel and improved ion exchange process for removing anionic detergents from water. It is still another object of this invention to provide a liquid ion exchange process for anionic detergents which provides good contact and transfer between the two phases of the exchange process without the formation of emulsions. It is still a further object of this invention to provide a highly economical method of treating sewage and waste waters to remove detergents. It is yet another object of this invention to provide an improved process for the separation and salvage of anionic surfactants from aqueous solutions. It is yet a further object of this invention to provide a process for removing anionic surfactants from aqueous systems without substantial contamination of the aqueous system with other organic materials. Other objects will appear hereinafter.

The objects of this invention are accomplished by a process which comprises contacting an aqueous solution of an organic anionic surfactant with a solution of an oil-soluble anion exchange material in a water-immiscible organic solvent having a density less than the aqueous solution, passing an inert gas through both solutions while the solutions are in contact, and separating the resulting solutions. In accordance with the present invention, it was discovered that the process was highly effective in separating and removing detergents from aqueous systems. It was also discovered that the process was adaptable to a large scale treatment of sewage and industrial wastes with low cost per unit treated. Incidental benefits which accrue in the process of the present invention when applied to sewage and industrial wastes include the reduction of biochemical oxygen demand, chemical oxygen demand, suspended solids and dissolved solids such as fatty acids, oils, greases, and the like. These benefits are sometimes of great importance.

The term "anionic surfactant" as used herein means a surface active agent which is capable of exhibiting anionic properties. The term "anion exchange material" as used herein refers to ion exchange materials which are capable of exchanging anionic materials. The term "water-immiscible organic solvent" as used herein refers to an organic material normally liquid which is substantially, but not necessarily entirely, insoluble in water. The term "inert gas" as used herein refers to a normally gaseous material which does not adversely affect the ion exchange process of the present invention. The term "oil soluble" as used herein with reference to the anion exchange material means that the material is soluble in the organic solvent to at least such an extent as to provide significant ion exchange properties.

While all the theoretical implications of the present invention are not completely understood, several theories have been advanced which enhance the understanding of the invention. It has been hypothesized that when the gas bubbles pass through the aqueous solution, the surface active materials concentrate at the gas-liquid interface. When the gas bubble enters the organic phase, the anionic surfactant is effectively transferred to the anion exchange material. The gas bubble passes through the organic phase and the gas escapes the solution. This process provides the same or a larger amount of transfer of the surfactant to the exchange material as would considerable additional mixing, but without the attendant emulsion formation.

The invention will be better understood with reference to the attached drawings in which FIGURE 1 is a simplified block flow diagram illustrating the principle and alternative steps of the present invention and FIGURE 2 is a schematic flow diagram illustrating a preferred embodiment of the present invention.

Referring now to FIGURE 1, aqueous feed 11 is fed to the treatment chamber 12 along with ion exchange feed 13. The two phases separate, the ion exchange feed 13 forming the upper phase and the aqueous feed 11 forming the lower phase within the treatment chamber 12. Inlet gas 14 is bubbled through the aqueous feed 11 and the ion exchange feed 13 within the treatment chamber 12. After the gas has passed through both phases it leaves the treatment chamber 12 as exit gas 15. The other exit streams from the treatment chamber 12 are the aqueous raffinate 16 and the loaded ion exchange solution 17. The aqueous raffinate can be sewered 19 or subjected to optional water treatment 18. The optional water treatment 18 can consist of such things as chlorination, softening, removal of entrained or dissolved ion exchange feed 13. In many cases, however, it will not be necessary to treat the aqueous raffinate 16 before feeding it to reuse 22. The reuse of the aqueous raffinate is particularly attractive in areas where there is a water shortage, where the aqueous solution still contains valuable components, or where the reuse is not affected by small amounts of materials which remain in the aqueous raffinate 16. The effluent 23 from the reuse 22 is circulated as aqueous feed 11. Specific operations in which reuse becomes particularly attractive include laundry operations, industrial cleansing processes, and industrial manufacturing processes.

The loaded ion exchange solution 17 is fed to surfactant stripping 24. Optionally, all or part of the loaded ion exchange solution 17 can be removed from the system as non-recirculated ion exchange solution 26. The non-recirculated ion exchange solution 26 can be used as a fuel or employed in some other process or use. Stripping agent 27 is fed to the surfactant stripping 24 to release the surfactant from the loaded ion exchange solution 17. After surfactant stripping 24, the regenerated ion exchange material 28 is recycled as ion exchange feed 13. In order to maintain the proper pH in the treatment chamber 12, acid 29 is added to the regenerated ion exchange material 28. The acid 29 can also be added directly to the treatment chamber 12 or to the aqueous feed 11. Fresh ion exchange material 31 is added to the ion exchange feed 13, if necessary. The proportions of organic solvent and ion exchange agent in the fresh ion exchange material 31 can be varied to suit the needs of the process. As will be discussed in further detail hereinafter, it is often advantageous to mix the ion exchange feed 13 and the aqueous feed 11 prior to feeding them to the treatment chamber 12. It is not critical where the ion exchange 13 or the aqueous feed 11 or a mixture thereof is fed to the treatment chamber 12.

From the surfactant stripping 24 is also recovered surfactant solution 32 which can consist of surfactant and water and excess stripping agent. There are at least three alternatives for the disposal for the surfactant solution 32. The first alternative is to discharge the surfactant solution 32 as waste 33. To avoid contamination of ground water, the surfactant solution 32 can be concentrated and burned. In some processes, the surfactant solution 32 may be used as recycle 34, without further treatment. This alternative is particularly advantageous where the reuse 22 can tolerate excesses of the stripping agent 27. The third alternative for the disposal of the surfactant solution 32 is to feed it to a surfactant recovery 36. A surfactant recovery 36 consists of neutralizing or removing any excess stripping agent 27 which is in the surfactant solution 32 and further concentrating and purifying the surfactant. The discharge streams from the surfactant recovery 36 will consist of a waste stream 37 and a surfactant stream 38. The surfactant 38 can be used as recycle 39 to the reuse 22 or recovered 41 and destroyed, resold or used for other end uses.

We turn our attention now to FIGURE 2 which is a schematic flow diagram illustrating a preferred method of carrying out the process of the present invention. Aqueous feed 11 is fed into an injection mixer 42. A suitable type mixer is illustrated on page 1203 of Chemical Engineer's Handbook, John H. Perry, 3rd ed., McGraw-Hill (1950). The passage of the aqueous feed 11 through the injection mixer 42 creates a suction on the line 43 causing the ion exchange material 13 in the tank 44 to flow through the line 45 and the check valve 47 into the line 43 and the injection mixer 42. At the same time acid 29 in the acid tanks 48 flows out of the acid tank 48 through the line 49 and the check valve 51 into the line 43 and injection mixer 42. Ambient air flows into the acid tank 48 through the pipe 52. The mixture of the aqueous feed 11, the ion exchange feed 13 and the acid 29 leaves the injection mixer 42 through a line 53 and flows to the distributor 54. The distributor 54 may consist of merely a pipe end, but preferably some sort of distributing or spraying device. It is not necessary that the distributor impart a high velocity to the mixture as it leaves the distributor 54. A flat tank with a perforated bottom serves as a good distributor of the mixture.

When the mixture of the aqueous feed 11, the ion exchange feed 13 and the acid 29 enters the treatment chamber 12 through the distributor 54 it separates into an aqueous phase 55 and an organic phase 56. The water in the mixture which leaves the distributor 54 passes through the organic phase 56 as it enters the aqueous phase 55. The organic phase 56 flows over the baffle 57 and baffle 58 and finally over the weir 59 and into the collection tank 61. The loaded ion exchange solution 17 is collected in the collection tank 61. The loaded ion exchange solution 17 is removed from the collection tank 61 by means of the pump 62 which is actuated by the action of the floats 63. The pump 62 forces the ion exchange solution 17 through the injection mixer 64 which causes the stripping agent 27 in the stripping solution tank 66 to flow through the line 67 and the check valve 68 and into the injection mixer 64. During the mixing of the loaded ion exchange solution 17 and the stripping agent 27, the loaded ion exchange solution becomes stripped. The mixture is fed through the line 69 and check valve 71 into the separation tank 72 where it separates into two phases, the upper phase being ion exchange feed 13 and the lower phase being surfactant solution 32. The surfactant solution is discharged through an overflow 73. As previously mentioned, the surfactant solution may be recycled, used as waste or given further treatment. The ion exchange feed 13 flows out of the separation tank 72 over the weir 74 and through the line 76 into the surge tank 77. The ion exchange feed 13 in the surge tank 77 flows through the line 78 through the float valve 79 which is actuated by the float 80. Sludge which accumulates in the separation tank 72 may be removed through the valve 81.

The liquid phase 55 flows under the baffle 57, over the baffle 85, under the baffle 58 and over the baffle 86. As the aqueous phase 55 flows through this tortuous path, gas bubbles 87 are discharged from the spargers 88 and passed upwardly through the aqueous phase 55 and through the organic phase 56. The direction of flow of the gas bubbles 87 is indicated by the solid arrows 89 and the directional flow of the aqueous phase is indicated by the dotted arrows 91. As the gas bubbles 87 pass through the aqueous phase 55, the surfactant becomes concentrated on the air-liquid interface and is deposited in the organic phase 56 when the gas bubbles 87 strike the interface 92 between the organic phase 56 and the aqueous phase 55.

Generally the spargers 88 in the first part of the tortous path are operated at a slower rate than in the last part of the treatment. The gas bubbles 87 act to coalesce and remove any droplets of oil in the last part of the treatment. In order to break up the gas bubbles 87 and to get better transfer to the surface of the air bubbles 87, it is advantageous to employ a mixing device just above the spargers 88. As the aqueous phase passes through each of the treatment chambers formed by the baffles, it becomes more free of surface active agent. The aqueous raffinate 16 is finally discharged through the overflow 93. As mentioned previously, this material is highly purified and may be reused or discharged into streams and rivers without contaminating them with substantial amounts of surface active agents. Any sludge which might accumulate within the treatment chamber 12 is removed by the top and interface skimmer 95 and the screw conveyor 96. If desired, the bottom and side walls of the treatment chamber 12 may be inclined so as to provide better flow of sludge into the screw conveyor 96. Various types of skimming in sludge removal devices are useful in the process of the present invention and will be obvious to those skilled in the art.

A wide variety of anion exchange materials are useful in the process of the present invention. As pointed out previously, ion exchange materials are commonly designated by the type of ion which is absorbed, rather than by the chemical properties of the ion exchange material. Accordingly, anion exchange materials could be cationic compounds. The types of materials useful in the present invention are those anion exchange materials, commonly referred to as "liquid ion exchange materials." The "liquid" refers to the fact that these ion exchange materials are used in solution rather than in a solid state as is the case with ion exchange resins. Many of the liquid ion exchange materials are liquids at room temperature, while others are normally solid materials. When the solid materials are dissolved in a suitable solvent, there is formed a solution which has ion exchange properties.

The preferred anion exchange materials are the water-immiscible amines and quaternary ammonium compounds. Suitable materials are illustrated in U.S. 2,877,250. Generally, all the anion exchange agents disclosed in that patent are operative in the present invention. With respect to these materials, several observations are in order. Amines which have a fairly high degree of insolubility in water are generally preferred since this will aid in preventing attrition of large amounts of amine. Consequently, it is preferred to employ materials having more than about 10 carbon atoms. As between the primary, secondary, and tertiary amines, the secondary amines are the preferred. The secondary amines are generally less soluble in water than the primary amines and are usually more effective extractants. The tertiary amines are also good extractants, however they are often more expensive and somewhat more difficult to prepare than the secondary amines. One advantage that the amines possess is that they can be readily stripped and reused. On the other hand, the quaternary ammonium compounds are very difficult to strip and therefore, where the extractant is to be reused, the quaternary ammonium compounds are not as highly preferred as the amines. Because of their excellent ability to extract, the quaternary ammonium compounds are highly useful where the loaded ion exchange solution is not to be recirculated, but is to be used as a fuel or some other end use.

Specific examples of the above type compounds which are useful in the present invention include lauryl amine, myristyl amine, palmityl amine, stearyl amine, oleyl amine, linoleyl amine, laurylmethyl amine, myristylmethyl amine, palmitylmethyl amine, stearylmethyl amine, oleylmethyl amine, linoleylmethyl amine, dilauryl amine, dimyristyl amine, dipalmityl amine, distearyl amine, dioleyl amine, dilinoleyl amine, trilauryl amine, trioctyl amine, dilaurylmethyl amine, distearylmethyl amine, dioctyl amine, dibenzyl amine, diisoctyl amine, benzyllauryl amine, 3-phenylpropyltetradecyl amine, trioctyl amine, triiosoctyl amine, benzyldilauryl amine, dibenzylmethyl amine, α-hydroxyethyldilauryl amine, β-hydroxydodecyl dinonyl amine, decylpiperidine, lauryl morpholine, octadecyl morpholine, lauryltrimethyl ammonium chloride, myristyltrimethyl ammonium chloride, palmityltrimethyl ammonium chloride, stearyltrimethyl ammonium chloride, oleyltrimethyl ammonium chloride, linoleyltrimethyl ammonium chloride, dilauryldimethyl ammonium chloride, dimyristyldimethyl ammonium chloride, dipalmityldimethyl ammonium chloride, distearyldimethyl ammonium chloride, dioleyldimethyl ammonium chloride, dilinoleyldimethyl ammonium chloride, trilaurylmethyl ammonium chloride, trioctylmethyl ammonium chloride, tridecylmethyl ammonium chloride, stearylbenzyldimethyl ammonium chloride, N-trimethyl-N'-dimethyllaurylpropylene diammonium dichloride, N-trimethyl-N'-dimethyl-tallow propylene diammonium dichloride, bis(1-isobutyl-3,5 - dimethylhexyl) amine, bis(3,5,7 - trimethyl octyl) amine, 6-benzyl amino-3,9-diethyl tridecane and N-lauryl-1,3-propylene diamine. Most of these preferred compounds are represented by the formulas:

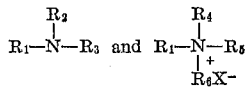

where $R_1$ is an aliphatic or aromatic radical of 6 to 24 carbon atoms, $R_2$ and $R_3$ are hydorgen or hydrocarbon radicals of 1 to 24 carbon atoms, $R_4$, $R_5$, and $R_6$ are hydrocarbon radicals of 1 to 24 carbon atoms and X is an inorganic anion. Compounds containing acetylenic unsaturation are generally not used as liquid ion exchange reagents because of the difficulty of preparation and because of their cost. However, if desired such nonpreferred agents can be employed.

Another group of materials which is useful in the present invention are the hydroxy fatty nitrogen compounds which have two nitrogen containing groups, one of which is situated on a carbon atom adjacent to a hydroxyl group, the other situated in a group occupying a terminal position. Commercially, these materials are prepared from oleic acid and accordingly have 18 carbon atoms in the main carbon chain. However, they may also be derived from other lower or higher molecular weight unsaturated acids. Because of the method of preparation, these materials are usually mixtures of isomers. Generally, the isomers are not separated for most commercial uses. Specific examples of such materials include 9-amino-10-hydroxystearonitrile,
9-dimethylamino-10-hydroxystearonitrile,
9-anilino-10-hydroxystearonitrile,
9-morpholino-10-hydroxystearonitrile,
10-dodecylamino-9-hydroxystearonitrile,
10-meta-aminophenylamino-9-hydroxystearonitrile,
9-diethanolamino-10-hydroxystearyl amine,
10-β-aminoethylamino-9-hydroxystearyl amine,
9-dodecylamine-10-hydroxystearylamine,
9-(β-cyanoethyl)-amino-10-hydroxystearonitrile,
10-N-(β-cyanoethyl)-dodecylamino-9-hydroxystearonitrile,
9-(gamma-aminopropyl)-methylamino-10-hydroxystearylamine,
9-(gamma-aminopropyl)-anilino-10-hydroxystearylamine,
9-morpholino-10-hydroxystearylmorpholine,
9-dimethyl amino-10-hydroxystearyldimethyl amine,
1,9-di(trimethyl ammonium)-10-hydroxyoctadecane dichloride,
1,9-di-(dimethylbenzyl ammonium)-10-hydroxyoctadecane dichloride,
1,9-di-(benzylmorpholinium)-1, 10-hydroxyoctadecane dichloride,
1,9-di-(trimethyl ammonium)-9-hydroxyoctadecane dimethyl sulfate,
1,9-di-trimethyl ammonium-10-hydroxyoctadecane dibromide,
1-cyano-9-(trimethyl-ammonium)-10-hydroxyheptadecane chloride,
1-cyano-10-(N-methylmorpholinium)-9-hydroxyheptadecane chloride, and
1-cyano-9-(trimethyl ammonium)-10-hydroxyheptadecane methyl sulfate.

These preferred materials are represented by formulas:

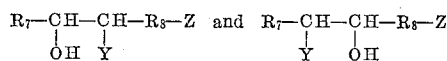

where $R_7$ and $R_8$ are aliphatic hydrocarbon radicals of 1 to 22 carbon atoms and the total number of carbon atoms in $R_7$ and $R_8$ is 6–22, Y is an amino radical or quaternary ammonium radical and Z is an amino radical, quaternary ammonium radical or nitrile.

The preferred organic solvents for the process of the present invention are the hydrocarbons. Examples of suitable hydrocarbon solvents include isooctane, kerosene, "Soltrol 170," a commercially available naphthenic hydrocarbon solvent, benzene, toluene, xylene, isodecane, fuel oils, mineral oils, hexane, heptane, and octane. Solvents which contain functional groups can also be employed in the present invention, providing that the functional groups do not adversely affect the extraction, and provided that the molecular weight is sufficiently high so as to make the organic solvents substantially insoluble in water. Illustrative of such compounds are the alcohols, aldehydes, ketones, and esters such as naturally occurring vegetable oils.

Generally, any surface active agent which exhibits anionic properties can be separated by the present invention. It should be clearly understood that the process can be used to recover materials not generally used as surfactants as long as the material has the anionic and surface active properties. It should be noted that many natural wastes, or their degradation products fall into this classification: the fatty acids, carboxylic acids in general such as acetic, propionic, butyric, valeric, stearic, oleic, palmitic, glycerides, proteins, protein hydrolysates, amino acids, bile acids, uric acid, pyrrolidone carboxylic acid, sodium acetyl salicylic acid, chlorocrotonic acid, undecylenic acid, sorbic acid, citaconic acid, acrylic acid, and citric acid. In some cases, certain surfactants may be cationic or exhibit amphoteric properties under certain conditions, but if they exhibit anionic properties in the process of the present invention, they will be considered as anionic surfactants for purpose of the present invention. Examples of preferred detergents which can be removed by the process of the present invention include the alkyl aryl sulfonates such as sodium dodecylbenzenesulfonate, sodium xylene sulfonate, sulfonated glycerines, alkyl phosphates, the alkyl alcohol sulfates, such as sodium lauryl sulfate, soaps, such as, sodium stearate, the β-alanines and other fatty amino acids and derivatives thereof such as sodium N-lauryl-β-aminopropionate, disodium N-tallow-β-imino dipropionate, N-lauryl-β-aminopropionic acid, and the partial sodium salt of N-lauryl-β-imino dipropionate. These latter materials are amphoteric in nature, and can be separated by the process of the present invention under certain conditions. Still other surfactants which can be separated by the process of the present invention include diisobutyl sodium sulfosuccinate, alkyl naphthalene sodium sulfonate, sulfonated castor oil, sulfonated tall oil, sulfonated petroleum residuals, salt of sulfated fatty acid ester, perfluro caprylic acid, sodium ligno sulfonate, sodium lauryl sulfoacetate, tetra sodium ethylene diamine tetra acetic acid, sodium salt of alkyl aryl polyether sulfonate, ammonium salt of sulfate ester of an alkyl phenoxy polyethanol, polyoxyethylene sorbitan tall oil ester, sodium methyl oleyl taurate, sodium salt of a sulfonated naphthalene-formaldehyde condensate, terpene fatty acid salt complex, triethanolamine alkyl aryl sulfonate, and ammonium tridecyl benzene sulfonate.

The anionic surfactant can be stripped from the loaded ion exchange material by treatment with a material which may be an aqueous basic solution or electrolyte, or certain acidic materials. Exemplary stripping solutions include solutions of sodium hydroxide, calcium hydroxide, barium hydroxide, soda, lime, ammonium hydroxide-ammonium chloride buffer, sodium carbonate, disodium hydrogen phosphate-sodium biphosphate buffer, ammonium acetate, sodium bicarbonate-sodium chloride mixture, methylamine, sodium perchlorate, calcium chloride, hydrochloric acid, sulfuric acid and the like. Emulsion formation during the stripping can be effectively countered by the addition of small amounts of additives such as isopropyl alcohol, n-decyl alcohol, dodecyl phenol, silicone fluids, and other de-emulsifying agents. In addition to these solutions, solid stripping agents, usually of a caustic nature such as sodium, calcium, and barium hydroxides, soda, lime and the like may also be used.

In some operations the aqueous solution of the surfactant is desirably acidified before extraction, preferably to a pH value below about 6.5 and desirably below about 6. Sulfuric acid, or any similar acid material may be used for this purpose. In other instances, the surfactant solution is treated without adjustment of the pH.

The process of the present invention can be carried out over a wide variety of temperatures. Generally it is preferred to carry out the process at temperatures in the range of 25 to 75° C. The temperature limits are governed by the freezing and boiling points of the liquid phases. One advantage of the present process is that where the aqueous solution is to be reused, such as in a laundry operation, the process can be carried out without cooling down the aqueous phase, thereby saving considerable amounts of money in heating the water.

One of the unique applications of the process of the present invention is the recovery of metal ions from solution. In general, solutions of metal ions are not surface active. However, if an anionic surface active agent capable of complexing or chelating with the metal is added to the solution, and this solution is subjected to the process of the present invention, the metal and the surfactant will be taken up in the organic phase, and can be subsequently stripped to recover the metal. Metals which can be recovered in this manner include polyvalent metals such as, calcium, iron, strontium, barium, magnesium, aluminum, and the like.

A wide variety of gaseous materials can be used as the gas in the process of the present invention. Examples include air, nitrogen, oxygen, hydrogen, helium, neon, argon, methane, ethane, propane, ethylene, propylene, acetylene, dichlorodifluoromethane, chlorotrifluoromethane, chlorodifluoromethane, 1,2 - dichloro - 1,1,2,2-tetrafluroethane, and perfluorocyclobutene.

The gas flow rate used in the present invention is best determined by trial. Because surface active agents concentrate themselves on surfaces, the bubble surface presented to the aqueous solution is more important than the volumetric flow rate. Accordingly, any specification of the volumetric flow rate must necessarily depend upon the size of the bubble. This in turn, is dependent on the type of sparger or other bubbling apparatus employed. Generally, the volumetric flow rate should be sufficiently low such that there is not violent agitation in the treating tank, the volumetric flow rate for many situations would fall in the range of .01 to 2 cubic feet of air per square foot of treating area. Types of gas distributing apparatus which can be used include sintered-glass air distributors, porous pipe spargers and perforated pipe spargers.

In order to further illustrate certain embodiments of the present invention, the following examples are included. Unless otherwise indicated, all parts and percentages used herein are by weight.

EXAMPLE I

An 8 gallon cylindrical (dia.=15 in.) glass tank without baffles was used as a treatment chamber. The glass tank was filled nearly to the top with liquid. Approximately 90% of the liquid was the aqueous phase and approximately 10% of the liquid was the oil phase. Air was introduced near the bottom of the aqueous phase by means of a fine-pored ½ in. sintered glass gas dispersion tube. The aqueous feed was introduced into the treatment chamber by flowing it into an 8 in. by 8 in. perforated aluminum pan suspended above the treatment chamber. Droplets fell from the perforated aluminum pan into the treatment chamber and passed through the oil phase to the aqueous phase. The ion exchange feed was introduced into the aqueous phase through an 8 mm. glass tube having 5 small jets in the tube for producing oil droplets. These droplets rose through the aqueous phase to the organic phase. Aqueous raffinate was removed near the bottom of the treatment chamber. The loaded ion exchange solution was drawn off at the top of the treatment chamber and fed to a mixer where the loaded ion exchange solution was mixed with a stripping solution. The mixture was then fed to a separation tank where the spent stripping solution and the regenerated ion exchange material were separated. The regenerated ion exchange material was then recycled through the treatment chamber.

Utilizing this equipment, an experiment was carried out using as the ion exchange feed a kerosene solution of 40 g./l. of a tertiary alkyl amine having randomly mixed alkyl groups of 8 and 10 carbon atoms. The aqueous feed was a solution of sodium dodecylbenzenesulfonate in water at a concentration of 324 p.p.m. and a pH of 4.00. In the present experiment the stripping section was not in operation. The ion exchange feed was recirculated. The ion exchange flow rate was 12 ml./min. and the aqueous feed flow rate varied between 200 and 400 ml./min. Air was introduced at approximately 1500 cc./min. After 2¾ hr. a sample of the aqueous raffinate was collected and analyzed for sodium dodecylbenzenesulfonate and found that the concentration was 190 p.p.m. and the pH of the raffinate was 4.70. After 3 hrs. the flow rate of air was increased such that there was considerable amount of agitation in the organic phase. At the same time the aqueous feed was changed to a solution containing 462 p.p.m. of sodium dodecyl benzene sulfonate at a pH of 2.60. Samples were again taken after 3¾ hrs. and 4¾ hrs. and it was found that the concentration of sodium dodecyl benzene sulfonate in the aqueous raffinate was 195 p.p.m. and 232 p.p.m. respectively.

EXAMPLE II

Using the same apparatus as in Example I and following the general procedures set forth therein, the following experiment was carried out. An ion exchange feed containing 40 g./l. of dioleyl amine in kerosene was used to treat an aqueous feed containing 147 p.p.m. of sodium dodecylbenzene sulfonate acidified with sulfuric acid to a pH of 3.12. As in the previous example, the stripping section was not in operation but the organic phase was merely recycled. After 1½ hrs. of operation a sample of the aqueous raffinate was taken and analyzed. It was found to contain 39 p.p.m. of sodium dodecyl benzene sulfonate and had a pH of 4.40. After 3½ hrs. of operation another sample was found to contain 31 p.p.m. of sodium dodecylbenzenesulfonate and had a pH of 4.77.

EXAMPLE III

Example II is repeated except that the dodecylbenzene sulfonate concentration in the aqueous feed was 202 p.p.m. A sample of the aqueous raffinate which was taken 1¼ hrs. after the start of the experiment contained 73 p.p.m. of sodium dodecylbenzenesulfonate at a pH of 4.38. Samples taken after 2½ and 3½ hrs. of operation contained 43 p.p.m. and 64 p.p.m. of dodecylbenzenesulfonate respectively. The raffinate also contained 32 p.p.m. of kerosene. At this point, the water flow was discontinued and the organic phase was recirculated and the circulation of the air was continued to see if any further sodium dodecylbenzenesulfonate could be removed. After 3½ hrs. of operation, a sample of the aqueous phase was found to contain 23.8 p.p.m. of sodium dodecylbenzenesulfonate.

EXAMPLE IV

Into a 300 cc. cylindrical separatory flask having a diameter of approximately 4.7 cm. equipped with a ½ in. gas dispersion tube were charged 250 ml. of an aqueous solution containing 82.9 p.p.m. of sodium dodecylbenzenesulfonate and 10 ml. of a kerosene solution containing 40 g./l. of dioleyl amine. The temperature was at 23° C. and the initial pH was adjusted to 3.9. Air flow rate was maintained at 176 ml./min. Samples of the liquid were analyzed periodically for concentrations of sodium dodecylbenzenesulfonate. The results of this experiment appears in Table I.

*Table I*

| Time (Min.) | DBS (p.p.m.) | Percent Extraction |
|---|---|---|
| 0 | 82.9 | |
| 10 | 38.2 | 53.9 |
| 30 | 15.3 | 81.5 |
| 52 | 7.9 | 90.5 |
| 69 | 7.0 | 91.6 |
| 90 | 2.7 | 96.8 |

EXAMPLE V

Example IV was repeated except that the initial concentration of dodecylbenzenesulfonate was 169 p.p.m. The results of this experiment appears in Table II.

*Table II*

| Time (Min.) | DBS (p.p.m.) | Percent Extraction |
|---|---|---|
| 0 | 169 | |
| 6 | 96.9 | 42.6 |
| 18 | 54.0 | 68 |
| 30 | 35.5 | 79 |
| 45 | 25.5 | 85 |
| 58 | 14.5 | 91.5 |
| 70 | 13.6 | 92.0 |

By comparing the results of Examples IV and V it can be seen that the percent of surfactant extracted does not depend on the initial surfactant concentration. It was found that where there was an excess of amine and hydrogen ions, that the extraction depended on the concentration of the surfactant only. Thus, this indicates that the rate of extraction is first order dependent on surfactant concentration only.

EXAMPLE VI

The effect of the pH on the extraction rate was determined by repeating Example IV at pH's of 3.09, 4.09, and 5.60. The results of these experiments appear in Table III.

*Table III*

| Initial pH=3.09 | | | Initial pH=4.09 | | | Initial pH=5.60 | | |
|---|---|---|---|---|---|---|---|---|
| Time (Min.) | DBS (p.p.m.) | Percent Extraction | Time (Min.) | DBS (p.p.m.) | Percent Extraction | Time (Min.) | DBS (p.p.m.) | Percent Extraction |
| 0 | 82.9 | | 0 | 82.9 | | 0 | 82.9 | |
| 10 | 56.2 | 32.2 | 10 | 62.5 | 24.6 | 10 | 60.5 | 27 |
| 21 | 38.2 | 53.9 | 21 | 47.0 | 43.3 | 21 | 38.6 | 53 |
| 42 | 22.2 | 73.0 | 43 | 28.6 | 65.5 | 43 | 23.4 | 71.8 |
| 53 | 18.1 | 78.2 | 54 | 15.7 | 81.0 | 54 | 19.9 | 76.0 |
| 96 | 9.0 | 91.9 | 82 | 8.7 | 89.5 | 90 | 9.75 | 88.0 |

These results show that pH does not have a great effect on the rate of removal of the surfactant in acidic media.

EXAMPLE VII

Example IV was repeated except that the starting solution contained 50 p.p.m. of sodium dodecylbenzenesulfonate. In order to determine the effective air flow rate two identical experiments were carried out using air flow rates of 193 ml. per minute and 44 ml. per minute. The results of these experiments appear in Table IV.

*Table IV*

| Air Flow Rate=193 ml./min. | | | Air Flow Rate=44 ml./min. | | |
|---|---|---|---|---|---|
| Time (Min.) | DBS (p.p.m.) | Percent Extraction | Time (Min.) | DBS (p.p.m.) | Percent Extraction |
| 0 | 50 | | 0 | 50 | |
| 10 | 25.2 | 49.6 | 11 | 37.3 | 25.4 |
| 30 | 7.9 | 84.2 | 22 | 24.4 | 51.2 |
| 51 | 4.6 | 90.8 | 47 | 7.3 | 85.4 |
| 66 | 4.2 | 91.6 | 65 | 4.3 | 91.4 |
| 114 | 1.8 | 94.4 | 90 | 2.19 | 95.6 |

These data show that the time for 50% removal of the detergent is markedly effected by air flow rate. A fourfold increase in air flow rate changes the extraction rate by a factor of 2.

EXAMPLE VIII

In order to determine the effect of temperature on the process of the present invention, Example IV is repeated using an aqueous feed of 162–169 p.p.m. of sodium dodecylbenzenesulfonate and an air flow rate of 38 ml. per minute at temperatures of 15° C., 22.5° C., 35.5° C., and 50° C. The results of these experiments appear in Table V.

*Table V*

| | Time (min.) | DBS (p.p.m.) | Percent Extraction | | Time (min.) | DBS (p.p.m.) | Percent Extraction |
|---|---|---|---|---|---|---|---|
| 15° C | 0 | 162.5 | | 35.5° C | 0 | 162.5 | |
| | 3 | 137 | 15.7 | | 3 | 137.5 | 15.1 |
| | 6 | 130.5 | 19.7 | | 6 | 113.0 | 30.2 |
| | 9 | 125 | 23.1 | | 9 | 97.5 | 39.8 |
| | 13 | 116 | 28.0 | | 21 | 60.0 | 62.9 |
| | 21 | 97.5 | 40.0 | | 33 | 34.4 | 78.8 |
| | 33 | 70 | 57.0 | | 45 | 24.4 | 84.9 |
| 22.5° C | 0 | 169 | | 50.0° C | 0 | 162.5 | |
| | 11 | 90.6 | 46.4 | | 3 | 130.5 | 19.7 |
| | 25 | 82.2 | 51.3 | | 6 | 107 | 34.2 |
| | 34 | 57.5 | 66.0 | | 9 | 92 | 43.4 |
| | 60 | 36.2 | 78.6 | | 14 | 72 | 55.7 |
| | 70 | 32.5 | 80.8 | | 21 | 50 | 69.2 |
| | 80 | 35.0 | 79.3 | | 33 | 22.5 | 86.2 |
| | 90 | 30.2 | 82.0 | | 45 | 7 | 95.7 |

These data illustrate the effectiveness of the process of the present invention even at relatively high water temperatures, and further illustrate that the rate of extraction increases with increasing temperature.

EXAMPLE IX

Using the equipment of Example IV, an aqueous feed containing 102 p.p.m. of sodium dodecylbenzenesulfonate and 253 p.p.m. of phosphate were treated with 10 ml. of isodecanol containing 40 g./l. of dioleyl amine. An air flow rate of 186 ml./min. was used. The results of this experiment appears in Table VI.

*Table VI*

| Time (min.) | DBS (p.p.m.) | Percent Extraction DBS | $PO_4$ (p.p.m.) | Percent Extraction $PO_4$ |
|---|---|---|---|---|
| 0 | 102 | | 253 | |
| 11 | 45 | 55.9 | | |
| 47 | 6.25 | 93.9 | 186 | 26.5 |

EXAMPLE X

Example IX was repeated except that the organic phase was 10 ml. of a quaternary ammonium chloride having one methyl group and three randomly distributed alkyl groups of 8–10 carbon atoms in benzene at a concentration of 40 g./l. The results of this experiment appears in Table VII.

*Table VII*

| Time (min.) | DBS (p.p.m.) | Percent Extraction DBS | $PO_4$ (p.p.m.) | Percent Extraction $PO_4$ |
|---|---|---|---|---|
| 0 | 102 | | 253 | |
| 11 | <1 | >99 | | |
| 49 | <1 | >99 | 64 | 74.7 |

This experiment shows the high rates of surfactant removal possible with quaternary ammonium compounds.

EXAMPLE XI

Example X was repeated except that the aqueous phase was 250 ml. of an aqueous solution containing 92.5 p.p.m. of sodium lauryl sulfate. The results of this experiment appears in Table VIII.

*Table VIII*

| Time (min.) | Sodium Lauryl Sulfate (p.p.m.) | Percent Extraction |
|---|---|---|
| 0 | 92.5 | |
| 11 | 62.0 | 33 |
| 15 | 45.0 | 51.3 |

EXAMPLE XII

Using the equipment of Example IV a 150 ml. aqueous solution containing 208 p.p.m. of copper, 1,000 p.p.m. of the disodium salt of N-lauryl-β-iminiodipropionate was treated with 30 milliliters of a kerosene solution 0.1259 molar in the racemic mixture of 9-dodecylamino-10-hydroxystearonitrile and 10-dodecylamino-9-hydroxystearonitrile. The air flow rate was 15 ml. per minute. The pH was adjusted to 9.2 by means of an ammonia-ammonium chloride buffer. The results of this experiment appear in Table IX.

*Table IX*

| Time (min.) | pH | Cu (p.p.m.) | Percent Extraction |
|---|---|---|---|
| 0 | 9.2 | 208 | |
| 32 | | 94 | 54.8 |
| 60 | | 48 | 76.9 |
| 100 | 9.08 | 42 | 79.8 |

EXAMPLE XIII

Example XII was repeated except that the pH was adjusted to 2.02 with a hydrochloric acid-potassium chloride mixture. The results of this experiment appear in Table X.

*Table X*

| Time (min.) | pH | Cu (p.p.m.) | Percent Extraction |
|---|---|---|---|
| 0 | 2.02 | 212 | |
| 32 | | 164 | 22.6 |
| 60 | | 122 | 42.4 |

EXAMPLE XIV

In a 70 gallon tank approximately 5 feet high, 2½ feet long and 1 foot wide equipped with a 2-foot aerator cylinder 2½ inches in diameter which is perforated and wrapped with cord in order to produce fine bubbles were treated dirty launderette effluent containing 82 p.p.m. of sodium dodecyl benzene sulfonate, 262 p.p.m. of polyphosphate, a biochemical oxygen demand of 68 p.p.m. and dissolved solids of 826 p.p.m.. The ion exchange feed used to treat this material was a solution of dioleyl amine in "Soltrol 170," a commercially available naphthenic hydrocarbon solvent, at a concentration of 40 grams per liter. The initial pH of this solution was 3.2 and the air flow rate was 0.87 cubic feet per minute. The volumetric ratio of aqueous phase to organic phase was 25:1. The temperature was 52° C. The results of this experiment appears in Table XI.

Table XI

| Time (min.) | pH | DBS (p.p.m.) | Percent Extraction | PO4 (p.p.m.) | BOD (p.p.m.) | Dissolved Solids (p.p.m.) |
|---|---|---|---|---|---|---|
| 0 | 3.2 | 82 | | 262 | 68 | 826 |
| 15 | 4.5 | 17 | 79.3 | 136 | | 724 |
| 30 | 4.6 | 5.6 | 93.0 | 139 | 35 | 650 |
| 45 | 4.6 | 3.9 | 95.2 | 135 | | 655 |
| 60 | 4.7 | 3.3 | 96.0 | 140 | 25 | 713 |

The organic phase was stripped with a 2% aqueous caustic solution and used to treat another batch of launderette effluent. The results were approximately the same as shown in Table XI. The organic phase was again stripped and the process was repeated through several cycles. After four cycles, the ion exchange material was as effective as in the first cycle.

EXAMPLE XV

Example XIV was repeated and the depth of the aerator was varied on each of three batches. The depths being 36, 31 and 26 inches. The times to remove half of the dodecyl benzene sulfonate were 6.3, 7.4, and 9.2 minutes, indicating that the greater depth of the aerator, the more efficient the process.

The foregoing examples have been included as illustrations of certain preferred embodiments of the present invention and are not to be construed as limitations on the scope thereof.

The embodiments of the present invention in which an exclusive property or privilege is claimed are defined as follows:

1. The process which comprises: (A) contacting an aqueous solution of an organic anionic surfactant with an organic solution comprising a water-immiscible organic solvent having a density less than the aqueous solution and a water-immiscible anion exchange material containing a total of more than 10 carbon atoms selected from the group consisting of amines and quaternary ammonium compounds having the formulae

and

where $R_1$ is selected from the group consisting of aliphatic and aromatic radicals of 6 to 24 carbon atoms, $R_2$ and $R_3$ are selected from the group consisting of hydrogen and hydrocarbon radicals of 1 to 24 carbon atoms, $R_4$, $R_5$ and $R_6$ are hydrocarbon radicals of 1 to 24 carbon atoms and X is an inorganic anion; (B) passing an inert gas through both solutions while the solutions are in contact; and (C) separating the resulting solutions.

2. The process of claim 1 wherein the organic anionic surfactant is a sulfonated detergent.

3. The process of claim 1 wherein the organic anionic surfactant is selected from the group consisting of fatty amino acids and derivatives thereof.

4. The process of claim 1 wherein the water-immiscible organic solvent is a hydrocarbon solvent.

5. The process of claim 1 wherein the inert gas is air.

6. The process of claim 1 wherein the water-immiscible anion exchange material is an amine.

7. The process which comprises: (A) contacting an aqueous solution of an alkyl aryl sulfonate with an organic solution comprising a water-immiscible hydrocarbon solvent having a density less than the aqueous solution and a water-immiscible anion exchange material containing a total of more than 10 carbon atoms selected from the group consisting of amines and quaternary ammonium compounds having the formulae

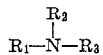

and

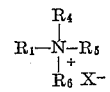

where $R_1$ is selected from the group consisting of aliphatic and aromatic radicals of 6 to 24 carbon atoms, $R_2$ and $R_3$ are selected from the group consisting of hydrogen and hydrocarbon radicals of 1 to 24 carbon atoms, $R_4$, $R_5$ and $R_6$ are hydrocarbon radicals of 1 to 24 carbon atoms and X is an inorganic anion; (B) passing air through both solutions while the solutions are in contact; and (C) separating the solutions.

8. The process of claim 7 wherein the alkyl aryl sulfonate is sodium dodecylbenzenesulfonate.

9. The process of continuously removing an organic anionic surfactant from an aqueous solution thereof which comprises: (A) contacting the aqueous solution of the organic anionic surfactant with an organic solution comprising a water-immiscible organic solvent having a density less than the aqueous solution and a water-immiscible anion exchange material containing a total of more than 10 carbon atoms selected from the group consisting of amines and quaternary ammonium compounds having the formulae

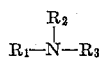

and

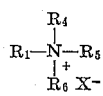

where $R_1$ is selected from the group consisting of aliphatic and aromatic radicals of 6 to 24 carbon atoms, $R_2$ and $R_3$ are selected from the group consisting of hydrogen and hydrocarbon radicals of 1 to 24 carbon atoms, $R_4$, $R_5$ and $R_6$ are hydrocarbon radicals of 1 to 24 carbon atoms and X is an inorganic anion; (B) passing an inert gas through both solutions while the solutions are in contact; (C) separating the resulting solutions; (D) stripping the surfactant from the loaded organic solution; (E) recycling the stripped organic solution for contacting further quantities of the aqueous solution of the organic anionic surfactant; and (F) separating the aqueous phase as aqueous raffinate.

10. The method of treating aqueous waste solutions to remove organic anionic surfactants therefrom which comprises: (A) contacting the aqueous waste solution with an organic solution comprising kerosene and a water-immiscible amine containing a total of more than 10 carbon atoms and having the formula

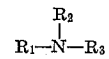

where $R_1$ is selected from the group consisting of aliphatic and aromatic radicals of 6 to 24 carbon atoms and $R_2$ and $R_3$ are selected from the group consisting of hydrogen and hydrocarbon radicals of 1 to 24 carbon atoms; (B)

passing air through the aqueous waste solution and the organic solution while said solutions are in contact; and (C) separating the resulting solutions.

11. The process which comprises: (A) contacting an aqueous solution of dodecyl benzene sulfonate with a solution of dioleyl amine in a naphthenic hydrocarbon solvent having a density less than the aqueous solution; (B) bubbling air through both solutions while the solutions are in contact; (C) separating the solutions; (D) treating the organic solution with dilute aqueous caustic; and (E) recycling the treated organic solution for contacting further quantities of the aqueous solution of dodecyl benzene sulfonate.

References Cited by the Examiner
UNITED STATES PATENTS

| | | | |
|---|---|---|---|
| 2,033,518 | 3/36 | Gephart | 23—271 |
| 2,808,375 | 10/57 | Manka | 210—21 |
| 2,761,563 | 9/56 | Waterman et al. | 210—21 |
| 2,922,831 | 1/60 | Block et al. | 260—705 |
| 3,074,820 | 1/63 | Kunin | 127—46 |
| 3,123,553 | 3/64 | Abrams | 210—37 |

OTHER REFERENCES

Analytical Chem., vol. 28, July–December 1956, pages 1827–1834.

Article in Sewage and Industrial Wastes, pp. 877–899 relied upon, particularly 896, vol. 31, July–December 1959.

Determination of Synthetic Detergent Content of Raw Water Supplies, Journal of America Water Works Association, vol. 50, No. 6, October 1958, pages 1345–1352.

Schwartz et al., Surface Active Agents, Copyright 1949 by Inter-Science Publ., Inc., pp. 151–160 relied upon.

MORRIS O. WOLK, *Primary Examiner.*